April 1, 1958  H. B. AULL ET AL  2,829,078
FLUX COMPOSITION
Filed May 19, 1955

INVENTORS
HENRY. B. AULL & ALBERT S. CROSS, JR.
BY
ATTORNEY

United States Patent Office 2,829,078
Patented Apr. 1, 1958

2,829,078
FLUX COMPOSITION

Henry B. Aull, Livingston, and Albert Stanley Cross, Berkeley Heights, N. J.

Application May 19, 1955, Serial No. 509,517

9 Claims. (Cl. 148—24)

This invention relates to fluxes for use in connection with hard soldering and brazing operations, and more particularly to a novel and highly improved flux composition.

Fluxes are used in connection with soldering and brazing operations in order to prevent oxidation of the heated metal surfaces and of the solder itself, and to clean the metal surfaces from any tarnish or impurities harmful to the free spreading of the solder. In operation, the flux combines with, dissolves, inhibits, or otherwise renders ineffective, those unwanted products of the brazing operation which would otherwise impair the braze or totally prevent brazing. Fluxes of the type encompassed by this invention are usually applied, by brushes or the like, in the form of a film to the surfaces over which the molten solder is to be spread, or may be applied to the solder itself. Hard solders for which the present flux is primarily intended comprise such solders or brazing alloys, e. g. silver or other brazing alloys, melting in the range of 700° F. to 2000° F., which are used in joining of metals.

The common fluxes generally used for the solders and brazing alloys described above include primarily alkali metal borates and fluorides. Such fluxes are not entirely satisfactory in the production of perfect solder joints, where long heating cycles or elevated brazing temperatures are required. Under these conditions, it has been found that presently used fluxes do not control the oxide formation.

Figure 2:
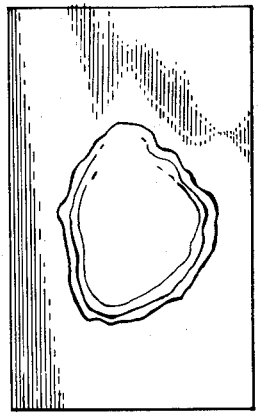
Figure 1:
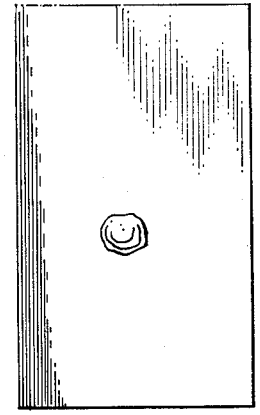

It is an object of this invention to provide a flux which gives sufficient protection to the metal surfaces, thus permitting the free and unimpeded flow of hard solders. It is a further object of the invention to provide a flux which aids the brazing material in wetting the surfaces of the parts to be joined. It is a still further object of the invention to provide a flux which induces free flow of the brazing material when in use, while also exhibiting the ability to remain in stored condition for long periods of time, without decomposition. Other objects and advantages of our flux will be apparent from the description hereinafter following, and from the drawings in which:

Figure 1 represents a top view of a sample of a stainless steel plate having a 45% Ag brazing alloy melted onto the surface with the use of a conventional flux, and Figure 2 represents a top view of a sample of a stainless steel plate having a 45% Ag brazing alloy melted onto the surface with the use of the flux of the instant invention.

There is no single universal flux which is best for all brazing applications and there are necessarily formulations of fluxes for different purposes. The American Welding Society has classified these formulations into six types. This invention is concerned with the A. W. S. brazing flux type No. 3 which is identified as containing any, some, or all of the following: boric acid, borates (sodium, potassium, lithium, etc.), fluorides (sodium, potassium, lithium, etc.), fluoborates (potassium, sodium, etc.) and wetting agents but must contain a fluorine compound. This type flux is referred to hereinafter as "an alkali metal-fluoride-borate type flux" and it is intended that this term be understood as being synonymous with the A. W. S. type 3 which is now well understood by those skilled in the art.

The above mentioned objects are accomplished according to this invention by including as an additive to "an alkali metal-fluoride-borate type flux," in a minor amount, as a constituent, what is hereinafter referred to as a "finely powdered water insoluble deoxidizer." By "finely powdered" we intend to include only those powders whose particle size does not exceed about 200 mesh. We also define the term "deoxidizer" as including within its scope: metals or alloys with a high affinity for oxygen, such as elemental boron, water insoluble boron compounds such as borides, or powders of easily oxidized metals such as Ti, Al, Mg, Mn, Zr, etc., which are oxygen getters.

These "deoxidizers" all impart the property to the flux of greater protection from oxygen, of the surface to be brazed. In preparing the flux of our invention the fluoride and borate powders or other salts together with the "finely powdered deoxidizer" are mixed with enough water to form a paste.

The additive described above is added in a minor amount by weight to the flux. Elemental boron has been found to be one of the more successful "deoxidizers." The minimum amount which could be added of this agent to obtain excellent results has been determined experimentally to be between 0.3 to 1.00% by weight of the finished flux. The optimum minimum value of boron to be added has been determined to be 0.75% by weight of the finished flux. Of the other "deoxidizers" a minimum amount of up to 3% by weight of the finished flux can be used.

The maximum amount of the "deoxidizer" has been empirically determined as being about 10%. When more than this amount is used we have noticed that the fluxing properties are adversely affected, e. g. the cleaning action of the flux.

In order to further define the term "alkali-metal-fluoride-borate type flux" and keeping in mind the classification of the American Welding Society, we have found that a preferred flux composition has the following approximate proportions of ingredients by weight:

| | Parts |
|---|---|
| Fluorine (added in the form of a compound e. g. salts such as potassium acid fluoride) | 1.8 |
| Alkali metal (added in the form of a compound e. g. salts such as potassium penta- or tetra-borate) | 2.5 |
| Boron (added in the form of a compound, e. g. salts such as boric acid or potassium penta- or tetra-borate) | 1.0 |
| Having as an additional ingredient the "deoxidizer," elemental boron | 0.04 |

A very large number of chemical compounds are useful in formulating fluxes and, as well understood by those skilled in the art, these compounds react with one another when they are mixed together and also afterwards during brazing. Thus, the resulting solution of compounds at brazing temperature is quite different chemically as well as physically from the ingredients which were initially mixed together.

Some specific flux compositions conforming to the teachings of our invention would be, for example:

(1)

| | Parts by weight |
|---|---|
| Potassium tetra-borate | 39.75 |
| Potassium acid fluoride | 59.50 |
| Elemental boron | 0.75 |

(2)

| | |
|---|---|
| Sodium borate | 29.75 |
| Boric acid | 29.75 |
| Sodium acid fluoride | 39.75 |
| Elemental boron | 0.75 |

(3)

| | |
|---|---|
| Potassium-fluoro-borate | 39.50 |
| Boric acid | 20 |
| Potassium borate | 39.50 |
| Magnesium powder (less than 200 mesh) | 1 |

(4)

| | |
|---|---|
| Potassium carbonate | 17 |
| Boric acid | 32.00 |
| Potassium acid fluoride | 48.50 |
| Calcium boride | 2.5 |

(5)

| | |
|---|---|
| Boric acid | 36 |
| Sodium borate | 3 |
| Potassium silico fluoride ($K_2SiF_6$) | 49 |
| Potassium acid fluoride ($KHF_2$) | 10 |
| Titanium powder | 2 |

(6)

| | |
|---|---|
| Boric acid | 59 |
| Potassium fluoride | 40 |
| Powdered aluminum | 1 |

It has been determined that some of the "deoxidizers" are more suitable than others, particularly for different brazing temperatures. For example, it has been found that when silicon is used as the "deoxidizer" incorporated into a flux such as just described, it is incapable of being stored. With silicon, there is a chemical reaction with the flux during storage by which the silicon is depleted. Therefore, when using this type of additive, it can only be added shortly before applying the flux. Thus, one of the desired properties of the "deoxidizer" is that the flux containing it should exhibit good storageability, i. e. it should be able to be kept in paste form for an indefinite length of time without loss of its properties.

The exact physical or chemical process by which the novel flux operates to obtain the good results described herein is not exactly known. The flux of the invention is better able to prevent oxidation than previously known fluxes. The "deoxidizers" may impart a reduction in surface tension in the molten brazing alloy, causing it to flow more freely over the work surfaces that have been heated to brazing temperature. In using a flux as described in the above example, it is believed that it protects the underlying metal from oxidation during the pre-heating and brazing cycle. Also, it will combine with the oxygen present thereby protecting the base metal from oxidation. This is a different action than obtained with other fluxes which chemically remove oxides after they are formed. Fluxes of the present invention protect the base metal by a preferential oxidation of the deoxidizer or oxygen getter.

The results of only one of the many experiments performed by us is indicated in the drawings. Using two identical samples of stainless steel, 1/32" by 3" by 1⅞ inches, a circular solder disc of ¼" diameter and 0.20" thick was melted onto each sample. Both figures represent pencil tracings from the actual speciments. Both speciments were subjected to the same amount of heating and for the same length of time. The flux used in these experiments was a paste-type flux consisting of a mixture of fluoride and borate salts and sold under the name of "APW 1200" by The American Platinum Works, Newark, New Jersey. Figure 1 shows the results of a brazing operation performed with this flux without the addition of a "deoxidizer" of the invention, while Figure 2 shows the results of a brazing operation performed with this flux with the addition of a "deoxidizer" of the invention. In each case the specimen was brushed with the flux and then the solder disc was placed on the flux and heat applied by means of a torch. In the former case, i. e. Figure 1, it was noted that no matter how much heat was applied, or for how long, the solder disc flowed only to the extent indicated and did not flow any further, whereas in Figure 2, the solder flowed out to a feather edge and occupied an area 1050% greater (10.5 times greater) than that occupied by the disc of Figure 1.

The new flux thus evidences an ability for use for longer brazing periods and for high temperature brazing. Also, larger parts can be brazed more successfully and quickly by using the flux of this invention.

The fluxes according to our invention can be applied in any desired manner, e. g. by applying them to the metal to be soldered or to the solder itself, as by brushing or dipping.

The above examples are not intended as a restriction of the invention, and it is intended to cover the invention broadly within the scope and spirit of the appended claims.

This application is a continuation-in-part of copending application Serial Number 418,326, filed March 24, 1954, and now abandoned.

What we claim is:

1. A flux composition of the alkali metal fluoride-borate type including about 0.3 to about 10 percent by weight of a member of the group consisting of a water insoluble boron compound, finely divided boron, titanium, aluminum, magnesium, manganese and zirconium metals.

2. A flux composition of the alkali metal fluoride-borate type including about 0.3 to about 10 percent by weight of finely divided elemental boron.

3. A flux composition of the alkali metal fluoride-borate type including about 0.3 to about 10 percent by weight of a water insoluble boron compound.

4. A flux composition of the alkali metal fluoride-borate type including about 0.75 percent by weight of finely divided elemental boron.

5. A flux composition of the alkali metal fluoride-borate type including about 2.5 percent by weight of a water insoluble boron compound.

6. A flux composition of the alkali metal fluoride-borate type, in which the alkali metal is selected from the group consisting of potassium and sodium, including about 0.3 to about 10 percent by weight of a member of the group consisting of a water insoluble boron compound, finely divided boron, titanium, aluminum, magnesium, manganese and zirconium metals.

7. A flux composition of the alkali metal fluoride-borate type, in which the alkali metal is selected from the group consisting of potassium and sodium, including about 0.3 to about 10 percent by weight of finely divided elemental boron.

8. A flux composition of the alkali metal fluoride-borate type, in which the alkali metal is selected from the group consisting of potassium and sodium, including about 0.3 to about 10 percent by weight of a water insoluble boron compound.

9. A flux composition of the alkali metal fluoride-borate type, in which the alkali metal is selected from the group consisting of potassium and sodium, including about 0.75 percent by weight of finely divided elemental boron.

References Cited in the file of this patent

UNITED STATES PATENTS

| | | |
|---|---|---|
| 1,748,785 | Miller | Feb. 25, 1930 |
| 1,940,574 | Austin | Dec. 19, 1933 |
| 1,981,798 | Bonsack | Nov. 20, 1934 |
| 2,493,372 | Williams | Jan. 3, 1950 |

OTHER REFERENCES

Metals Handbook, 1948 edition, pages 71–84.
1955 S.A.E. Handbook, pages 281–283.